3,691,083
CURING AGENT MIXTURES FOR
EPOXIDE RESINS
Ulrich Niklaus, Aesch, Basel-Land, and Dieter Baumann, Birsfelden, Switzerland, assignors to Ciba-Geigy AG, Basel, Switzerland
No Drawing. Filed Nov. 16, 1970, Ser. No. 90,013
Claims priority, application Switzerland, Nov. 21, 1969, 17,382/69
Int. Cl. C09k 3/00; H05b 33/00
U.S. Cl. 252—182                               7 Claims

ABSTRACT OF THE DISCLOSURE

Curing agent mixtures for epoxide resins, containing (1) a precondensate of (a) cycloaliphatic dicarboxylic acid anhydride, for example hexahydrophthalic anhydride, (b) a dimeric or trimeric $C_{14}$–$C_{24}$ fatty acid (for example "Empol 1024") and (c) a polyglycidyl-ether of polyglycidyl-ester (for example butanediol-1,4-diglycidyl-ether or Araldite F), and (2) a $C_{12}$–$C_{18}$-alkylsuccinic anhydride or alkenylsuccinic anhydride (for example dodecenylsuccinic anhydride). To manufacture the precondensate (1), 0.2 to 0.7 carboxyl groups of the oligometric fatty acid and 0.1 to 0.4 epoxide groups of the polyglycidyl-ether or polyglycidyl-ester are employed for 1 mol of anhydride. 5–50 parts by weight of alkylsuccinic anhydride or alkenylsuccinic anhydride are used per 100 parts of anhydride precondensate. The new curing agent mixtures are liquid and can be mixed with epoxide resins in any desired ratio; the cured shaped articles show good flexibility and have a very low dielectric loss above the 2nd glass point.

---

The conversion of polyepoxides which contain more than one epoxide group in the molecule, by reaction with polybasic carboxylic acids or their anhydrides or mixtures of both is known. In this, depending on the choice of the reagents, cured shaped articles of high heat resistance, to highly flexible products, which are very soft at room temperature, are obtained. In industry, and especially also in the field of electrical insulation, for example for potting electronic components, epoxide resin casting compositions are desired which have good processability, possess a long pot life and after curing still display adequate flexibility, even at low temperatures.

Now various curing agents based on carboxylic acids have been proposed which together with the customary polyepoxide resins based on phenolic, aliphatic or heterocyclic compounds yield curable moulding compositions which fulfill at least a part of the requirements made; such curing agents are, for example: dodecenylsuccinic anhydride, tetrapropenylsuccinic anhydride, and polysebacic polyanhydride. All known curing agents of this nature however suffer from disadvantages which handicap their use in industry. Either the curing agents concerned are solid at room temperature and have to be fused for processing, or be mixed with the polyepoxide whilst hot, whereby the pot life of the mixture is reduced, and/or the cured mouldings have a high dielectric loss factor tg δ even at room temperature, with tg δ rising in the region of the second glass transition point, that is to say in most cases near room temperature or even below.

The subject of the present invention is hence a curing agent mixture for epoxide resins, characterised in that it contains (1) an anhydride precondensation product of (a) a cycloaliphatic dicarboxylic acid anhydride; (b) an unsaturated or saturated aliphatic-cycloaliphatic higher dicarboxylic or tricarboxylic acid, which has been manufactured by dimerisation or trimerisation of unsaturated monomeric fatty acids having 14 to 24 carbon atoms in the molecule, preferably 16 to 18 carbon atoms, and optionally subsequent hydrogenation of such a dimeric or trimeric fatty acid, and (c) a polyglycidyl-ether of a polyalcohol or polyphenol containing at least two hydroxyl groups, or a polyglycidyl-ester of a polycarboxylic acid containing at least two carboxyl groups, using, in each case, 0.2 to 0.7 carboxyl group equivalent of the higher dicarboxylic or tricarboxylic acid (b) and 0.1 to 0.4 epoxide group equivalent of the polyglycidyl-ether or polyglycidyl-ester (c) per 1 mol of the dicarboxylic acid anhydride (a); and (2) a $C_{12}$–$C_{18}$-alkylsuccinic or alkenylsuccinic anhydride in an amount of 5 to 50 parts by weight, preferably 20 to 40 parts by weight, per 100 parts by weight of the anhydride precondensation product (1).

The invention further relates to heat-curable mixtures which contain a polyepoxide compound with an average of at least two epoxide groups in the molecule, and, as the curing agent, a curing agent mixture according to the invention, defined above.

The curing agents according to the invention are liquid at room temperature, of very low sensitivity to moisture, can be mixed with polyepoxides in any desired ratios, and cure on use of higher temperatures, with the optional addition of the customary curing accelerators, to give flexible mouldings which even at temperatures far above the second glass transition point will still show an astonishingly low dielectric loss factor tg δ.

Admittedly, the oligometric fatty acids used can also be employed by themselves as curing agents for polyepoxides. Because of the low density of crosslinking, the cured products are however extremely soft and of inadequate mechanical strength. On the other hand, mixtures of the oligomeric fatty acids mentioned with polycarboxylic acid anhydrides are unstable and disintegrate within a short time.

As cycloaliphatic dicarboxylic acid anhydrides (a) which can be employed for the manufacture of the anhydride precondensation products (1), there may above all be mentioned: $\Delta^4$-tetrahydrophthalic anhydride, 4-methyl-$\Delta^4$-tetrahydrophthalic anhydride, isomerised 4-methyl-$\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride and 4-methyl-3,6-endomethylene-$\Delta^4$-tetrahydrophthalic anhydride (=methylnadic anhydride).

The aliphatic-cycloaliphatic higher dicarboxylic or tri carboxylic acids (b) which are suitable for the manufacture of the anhydride precondensate (1) are obtainable by dimerisation or trimerisation of monomeric fatty acids having sufficient functional double bonds or of fatty acids derived from drying or semi-drying oils.

Possible monomeric fatty acids of this nature are those which contain 14 to 24 carbon atoms, preferably 16 to 18 carbon atoms, in the molecule and possess at least one reactive double bond in the molecule, such as for example oleic acid, linoleic acid, linolenic acid, ricinenic acid and also fatty acids containing hydroxyl groups, such as for example ricinoleic acid.

As suitable semi-drying or drying oils from which such fatty acids are derived there may be mentioned: cottonseed oil, rape oil, safflower oil, sesame oil, sunflower oil, soya oil, tung oil, linseed oil, oiticia oil, perilla oil and the like.

In the known dimerisation process for the manufacture of the aliphatic-cycloaliphatic dicarboxylic acids, the fatty acids, which must contain at least one double bond in the molecule, largely react to form an acid mixture which principally consists of dimeric, and to a slight extent also of trimeric or higher-molecular, constituents. The monomeric, insufficiently functional acids are removed from the reaction mixture by distillation.

The aliphatic-cycloaliphatic dicarboxylic acids obtained by polymerisation, which are unsaturated up to a certain degree, can be used directly, or after a subsequently effected hydrogenation, to manufacture the anhydride precondensate.

As polyglycidyl-ethers or polyglycidyl-esters (c) which can serve for the manufacture of the anhydride precondensates (1), there may for example be mentioned: diglycidyl-ethers or polyglycidyl-ethers of polyhydric aliphatic alcohols, such as 1,4-butanediol, or polyalkylene glycols, such as polypropylene glycols; diglycidyl ethers or polyglycidyl ethers of cycloaliphatic polyols, such as 2,2-bis-(4-hydroxycyclohexyl)propane; diglycidyl ethers or polyglycidyl ethers of polyhydric phenols, such as resorcinol, bis - (p-hydroxyphenyl)methane, 2,2 - bis(p-hydroxyphenyl)-propane (=bisphenol A), 2,2-bis(4'-hydroxy-3',5'-dibromophenyl)-propane, 1,1,2,2 - tetrakis-(p-hydroxyphenyl) ethane, or condensation products of phenols and formaldehyde obtained under acid conditions, such as phenol novolaks and cresol novolaks.

Polyglycidyl-esters of polybasic carboxylic acids, such as phthalic acid, terephthalic acid, $\Delta^4$-tetrahydrophthalic acid and hexahydrophthalic acid.

As component (2) of the curing agent mixture according to the invention, a $C_{12}$–$C_{18}$-alkylsuccinic or alkenylsuccinic anhydride is added, such as tetrapropenylsuccinic anhydride or preferably dodecenylsuccinic anhydride.

As polyepoxide compounds having an average of more than one epoxide group in the molecule, which are employed in the heat-curable mixtures according to the invention, there may in particular be mentioned: aliphatic polyepoxides, such as epoxyethyl-3,4-epoxycyclohexane (vinylcyclohexene diepoxide), limonene diepoxide, dicyclopentadiene diepoxide, bis(3,4-epoxycyclohexylmethyl)adipate, (3',4' - epoxycyclohexylmethyl)-3,4 - epoxy - cyclohexanecarboxylate, (3',4'-epoxy-6'-methyl - cyclohexylmethyl) - 3,4 - epoxy-6-methylcyclohexanecarboxylate; 3 - (3',4' - epoxycyclohexyl)-2,4-dioxaspiro(5.5) - 8,9 - epoxy - undecane, 3-(glycidyloxy-ethoxyethyl)-2,4-dioxaspiro (5.5)-8,9-epoxy-undecane and 3,9-bis(3',4'-epoxycyclohexyl)-spirobi(metadioxane).

Diglycidyl-ethers or polyglycidyl-ethers of polyhydric alcohols, such as 1,4-butanediol or polyglycols such as polypropylene glycols; diglycidyl-ethers or polyglycidyl-ethers of polyhydric phenols, such as resorcinol, bis(p-hydroxyphenyl) - methane, 2,2 - bis(p-hydroxyphenyl)-propane (=diomethane), 2,2 - bis(4' - hydroxy-3',5'-dibromophenyl) - propane, 1,1,2,2 - tetrakis(p-hydroxylphenyl)ethane, or condensation products of phenols with formaldehyde obtained under acid conditions, such as phenol novolacs and cresol novolacs; furthermore, di- or poly-β-methyl-glycidyl)-ethers of the abovementioned polyalcohols and polyphenols.

Polyglycidyl-esters of polybasic carboxylic acids, such as phthalic acid, terephthalic acid, tetrahydrophthalic acid and hexahydrophthalic acid.

N-glycidyl derivatives of amines, amides and heterocyclic nitrogen bases, such as N,N-diglycidylaniline, N,N-diglycidyltoluidine, and N,N,N',N'-tetraglycidyl-bis(p-aminophenyl)methane; triglycidyl-isocyanurate; N,N'-diglycidyl-5,5-dimethylhydantoin.

The curable mixture according to the invention can furthermore contain known curing accelerators; such accelerators are, for example: tertiary amines, their salts or quaternary ammonium compounds, for example 2,4,6-tris(dimethylaminomethyl)-phenol, benzyldimethylamine, 1-methylimidazole, 2-ethyl-4-methylimidazole, 4-aminopyridine and triamylammonium phenolate, or alkali metal alcoholates, such as for example sodium hexanetriolate.

The curing of the mixtures of polyepoxide resin and curing agent mixture according to the invention is preferably carried out in the temperature range of 80–120° C.

The term "curing," as used here, denotes the conversion of the soluble, either liquid or fusible, polyepoxides into solid, insoluble and infusible, three-dimensionally cross-linked products or materials, and, in particular, as a rule with simultaneous shaping to give shaped articles, such as castings, pressings, laminates and the like, or film-like structures, such as coatings, lacquer films or adhesive bonds.

The curable mixtures according to the invention can furthermore contain suitable plasticisers, such as dibutyl phthalate, dioctyl phthalate or tricresyl phosphate, inert organic solvents or so-called active diluents, such as especially monoepoxides, for the example styrene oxide, butylglycid or cresylglycid.

Furthermore, the curable mixtures according to the invention can be mixed, in any phase before cure, with extenders, fillers and reinforcing agents, such as for example coal tar, bitumen, textile fibres, glass fibres, asbestos fibres, boron fibres, carbon fibres, mineral silicates, mica, quartz powder, titanium dioxide, aluminum oxide trihydrate, bentones, kaolin, silica aerogel, or metal powders, such as aluminium powder or iron powder, and also with pigments and dyestuffs, such as carbon black, oxide pigments, titanium dioxide and others. Furthermore, other customary additives, for example flameproofing agents, such as antimony trioxide, agents for conferring thixotropy, flow control agents, such as silicones, cellulose acetobutyrate, polyvinyl butyral, waxes, and stearates (which in part are also used as mould release agents) can also be added to the curable mixtures.

The manufacture of the curable mixtures according to the invention can be effected in the customary manner, with the aid of known mixing equipments (stirrers, kneaders or rolls).

The hot-curable epoxide resin mixtures according to the invention are above all employed in the fields of surface protection, the electrical industry and laminating processes. They can be employed in a formulation suited in each case to the particular end use, in the unfilled or filled state, as coating agents, lacquers, compression moulding compositions, dipping resins, casting resins, injection moulding formulations, impregnating resins and adhesives, and as tool resins, laminating resins and compositions for potting electronic components.

In the examples which follow, unless otherwise stated, parts denote parts by weight and percentages denote percentages by weight. The relationship of parts by volume to parts by weight is as of the millilitre to the gram.

The 10% value of tg δ is the temperature at which the dielectric loss factor tg δ exceeds a value of $1 \times 10^{-1}$.

EXAMPLE 1

30 parts of hexahydrophthalic anhydride, 50 parts of an oligomeric fatty acid mixture (Z) manufactured by dimerisation of unsaturated higher fatty acids and having an acid equivalent weight of 292 (containing approx. 75% of dimeric and 25% of trimeric fatty acids with an average number of 36 C atoms per molecule, registered tradename "Empol 1024"), and 7.5 parts of 1,4-butanediol-diglycidylether are allowed to react in reaction flask at 140° C. for 6 hours. After cooling, a liquid of medium viscosity is obtained, which tends to crystallise.

30 parts of dodecenylsuccinic anhydride are added to 70 parts of the anhydride precondensation product obtained. A clear, stable liquid with a viscosity of 3,500–4,500 cP at 25° C. results (curing agent mixture I).

Comparison experiments (a) 30 parts of polysebacic anhydride are added to 70 parts of the anhydride precondensation product manufactured according to Example 1, whilst warming to 100–120° C. Below 100° C., the mixture solidifies through crystallisation of polysebacic anhydride, to give an amorphous mass.

(b) 30 parts of diisobutylenemaleic anhydride are added to 70 parts of the anhydride precondensation product manufactured according to Example 1. After prolonged standing at room temperature (25° C.), disintegration occurs.

EXAMPLE 2

30 parts of hexahydrophthalic anhydride, 50 parts of the oligomeric fatty acid mixture Z (as described in Example 1) and 7.5 parts of a polyglycidyl-ether resin manufactured by condensation of epichlorohydrin with 2,2-bis(p-hydroxyphenyl)-propane in the presence of alkali, which is liquid at room temperature and has an epoxide content of 5.2 epoxide equivalents per kg. (epoxide resin A), are allowed to react in a reaction flask at 140° C. for 6 hours. After cooling, a liquid of medium viscosity is obtained, which tends to crystallise.

30 parts of dodecenylsuccinic anhydride are added to 70 parts of the reaction mixture. A clear, stable liquid results.

EXAMPLE 3

30 parts of hexahydrophthalic anhydride, 50 parts of the oligomeric fatty acid mixture Z (as described in Example 1) and 10 parts of $\Delta^3$-cyclohexene-1,1-dimethanoldiglycidyl-ether are allowed to react in a reaction flask at 140° C. for 6 hours. After cooling, a liquid of medium viscosity is obtained, which tends to crystallise.

30 parts of dodecenylsuccinic anhydride are added to 70 parts of the reaction mixture. A clear, stable liquid results.

EXAMPLE 4

30 parts of isomerised 4-methyl-$\Delta^4$-tetrahydrophthalic anhydride, 50 parts of the oligomeric fatty acid mixture Z (as described in Example 1) and 7.5 parts of 1,4-butanedioldiglycidyl-ether are allowed to react in a reaction flask at 140° C. for 6 hours. After cooling, a liquid of medium viscosity is obtained, which tends to crystallise.

30 parts of dodecenylsuccinic anhydride are added to 70 parts of the reaction mixture. A clear, stable liquid results.

EXAMPLE 5

30 parts of isomerised 4-methyl-$\Delta^4$-tetrahydrophthalic anhydride, 50 parts of an oligomeric fatty acid mixture ($Z_1$) manufactured by dimerisation of technical oleic acid and having an acid equivalent weight of 286 (containing approx. 95% of dimeric and approx. 5% of trimeric fatty acid with an average number of 36 C atoms per molecule, registered trademark "Empol 1014") and 7.5 parts of hexahydrophthalic acid diglycidyl ester are allowed to react in a reaction flask at 150° C. for 6 hours. After cooling, a highly viscous resinous mass is obtained.

30 parts of dodecenylsuccinic anhydride are added to 70 parts of the reaction mixture. A clear, stable liquid results.

MANUFACTURE OF SHAPED ARTICLES

EXAMPLE I 100 parts of a bisphenol A-diglycidyl-ether manufactured by condensation of epichlorohydrin with 2,2-bis(p-hydroxyphenyl)propane (bisphenol A) in the presence of alkali, which is liquid at room temperature and has an epoxide content of 5.2 epoxide equivalents/kg. (=epoxide resin A), 160 parts of the curing agent mixture I according to the invention, described in Example 1, and 2 parts of the curing accelerator benzyldimethylamine are mixed at room temperature and poured into casting moulds of aluminium, warmed to 80° C. The mixture is first allowed to gel over a total of 4 hours at 80° C., and is subsequently cured. The resulting shaped articles possess the excellent mechanical and electrical properties listed below:

Flexural strength, VSM 77103 (kp./mm.²) ____ 7–11
Deflection, VSM 77103 (mm.) _____ >20
Impact strength, VSM 77105 (kp. cm./cm.²) ___ >25
Heat distortion point according to Martens DIN 53458 (° C.) _____ 30–35
Water absorption after 4 days, 25 °C., 60 x 10 x 4 mm. test rod (percent by weight) _____ 0.2–0.3
Tensile strength, VSM 77101 (kp./mm.²) _____ 3–4
Elongation at break VSM 77101 (percent) _____ 30–70
10% value of tg δ 0303 VDE (° C.) _____ 85–95
Tracking resistance VDE 0303 (level) _____ KA 3C

COMPARISON EXPERIMENT 100 parts of the epoxide resin A used in Example I are mixed with 120 parts of the curing agent dodecenylsuccinic anhydride and 1 part of the curing accelerator 2,4,6-tris-(dimethylaminomethyl)phenol at 80° C. and poured into casting moulds of aluminium, warmed to 80° C. The mixture is first allowed to gel over a total of 4 hours at 80° C. and is subsequently cured. The resulting shaped articles possess distinctly worse mechanical flexible properties than the shaped articles obtained with a curing agent Mixture I of the invention, according to the above Example I, as is shown by the measured values below:

Flexural strength, VSM 77103 (kp./mm.²) ____ 8–9
Deflection, VSM 77103 (mm.) _____ 7–9
Impact strength, VSM 77105 (cm. kp./cm.²) ___ 6–8
Heat distortion point according to Martens DIN 53458 (° C.) _____ 45–55
Water absorption point after 4 days, 25° C., 60 x 40 x 4 mm. test rod (percent by weight)_ 0.2–0.3
Tensile strength VSM 77101 (kp./mm.²) _____ 3.5–4.5
Elongation at break VSM 77101 (percent) _____ 4–6
10% value of tg δ VDE 0303 (° C.) _____ >100

EXAMPLE II 100 parts of the cycloaliphatic diepoxide compound of formula

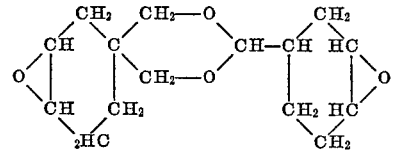

(=3',4'-epoxyhexahydrobenzal - 3,4 - epoxycyclohexane-1,1-dimethanol) which is liquid at room temperature and has an epoxide content of 6.2 epoxide equivalents/kg. (epoxide resin B) are mixed at 80° C. with 165 parts of the curing agent mixture I according to the invention, described in Example 1, and 6 parts of a curing accelerator, consisting of a Na alcoholate solution produced by dissolving 0.82 parts of sodium metal in 100 parts of 3-hydroxymethyl - 2,4 - dihydroxypentane at elevated temperature, and the mixture is poured into casting moulds of aluminium, prewarmed to 80° C. The mixture is first allowed to gel over a total of 4 hours at 80° C., and is subsequently cured.

The resulting flexible shaped articles possess excellent mechanical and electrical properties:

Flexural strength VSM 77103 (kp./mm.²) ___ 10–13
Deflection VSM 77103 (mm.) _____ 11–14
Impact strength VSM 77105 (cm. kp./cm.²)__ 10–15
Heat distortion point according to Martens DIN 53458 (° C.) _____ 50–60
Water absorption point after 4 days, 25° C. 60 x 40 x 4 mm. test rod (percent by weight) _____ 0.25–0.35
Tensile strength VSM 77101 (kp./mm.²) ____ 5–7
Elongation at break VSM 77101 (percent) ___ 5–10
10% value of tg δ VDE 0303 (° C.) _____ 150

We claim:
1. A curing agent composition for epoxide resins which comprises (1) an anhydride precondensation product of (a) a cycloaliphatic dicarboxylic acid anhydride; (b) an unsaturated or saturated aliphatic-cycloaliphatic higher dicarboxylic of from 28–48 carbon atoms or tricarboxylic acid of from 42–72 carbon atoms, and (c) a member selected from the group consisting of a polyglycidyl-ether of a polyalcohol or polyphenol containing at least two hydroxyl groups and a polyglycidyl-ester of a polycarboxylic acid containing at least two carboxyl groups, with 0.2 to 0.7 equivalent of carboxyl groups of tthe higher dicarboxylic or tricarboxylic acid (b) and 0.1 to 0.4 equivalent of epoxide groups of the polyglycidyl-ether or polyglycidyl-ester (c) being employed per 1 mol of the dicarboxylic acid anhydride (a); and (2) a $C_{12}$–$C_{18}$-alkylsuccinic or alkenylsuccinic anhydride in an amount of 5 to 50 parts by weight per 100 parts by weight of the anhydride precondensation product (1).

2. A curing agent composition as claimed in claim 1, for epoxide resins which comprises (1) an anhydride precondensation product of (a) a cycloaliphatic dicarboxylic acid anhydride; (b) an unsaturated or saturated aliphatic-cycloaliphatic higher dicarboxylic of from 32–38 carbon atoms or tricarboxylic acid of from 48–54 carbon atoms, and (c) a member selected from the group consisting of polyglycidyl-ether of a polyalcohol or polyphenol containing at least two hydroxyl groups and a polyglycidyl-ester of a polycarboxylic acid containing at least two carboxyl groups, with 0.2 to 0.7 equivalent of carboxyl groups of the higher dicarboxylic or tricarboxylic acid (b) and 0.1 to 0.4 equivalent of epoxide groups of the polyglycidyl-ether or polyglycidyl-ester (c) being employed per 1 mol of the dicarboxylic acid anhydride (a), and (2) a $C_{12}$–$C_{18}$-alkylsuccinic or alkenylsuccinic anhydride in an amount of 20 to 40 parts by weight, per 100 parts by weight of the anhydride precondensation product (1).

3. A curing agent composition as claimed in claim 1, characterised in that the anhydride or isomerised 4-methyltetrahydrophthalic anhydride as reaction component (a).

4. A curing agent composition as claimed in claim 1, characterised in that the anhydride precondensation product (1) is derived from the diglycidyl ether of 2,2-bis-(p-hydroxyphenyl)-propane as reaction component (c).

5. A curing agent composition as claimed in claim 1, characterised in that the anhydride precondensation product (1) is derived from the diglycidyl-ether of 1,4-butanediol or $\Delta^3$-cyclohexene-1,1-dimethanol as reaction component (c).

6. A curing agent composition as claimed in claim 1, characterised in that the anhydride precondensation product (1) is derived from the diglycidyl-ester of hexahydrophthalic acid.

7. A curing agent composition as claimed in claim 1, characterised in that it contains dedecenylsuccinic anhydride as component (2).

References Cited
UNITED STATES PATENTS

| | | | |
|---|---|---|---|
| 3,078,235 | 2/1963 | Bowman et al. | 252—182 |
| 3,408,215 | 10/1968 | Wismer et al. | 106—252 |

JOHN D. WELSH, Primary Examiner

U.S. Cl. X.R.

260—47